United States Patent [19]

White

[11] Patent Number: 4,942,222

[45] Date of Patent: Jul. 17, 1990

[54] METHOD FOR REMOVING ODOR COMPONENTS FROM POLYPHENYLENE ETHER RESINS WITH KETONE

[75] Inventor: Dwain M. White, Schenectady, N.Y.

[73] Assignee: General Electric Company, Schenectady, N.Y.

[21] Appl. No.: 306,132

[22] Filed: Feb. 6, 1989

[51] Int. Cl.$^5$ .............................................. C08G 65/46
[52] U.S. Cl. ...................................... 528/493; 528/212
[58] Field of Search ................................. 528/493, 212

[56] References Cited

U.S. PATENT DOCUMENTS

| | | | |
|---|---|---|---|
| 2,120,343 | 6/1938 | Wolf | 260/2 |
| 3,014,019 | 12/1961 | Czenkusch | 260/94.9 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,423,384 | 1/1969 | Hagemeyer, Jr. et al. | 260/93.7 |
| 4,039,510 | 8/1977 | Cooper et al. | 260/47 |
| 4,088,634 | 5/1978 | Cooper et al. | 260/47 |
| 4,431,779 | 2/1984 | White et al. | 525/397 |
| 4,642,358 | 2/1987 | Aycock et al. | 549/245 |

*Primary Examiner*—Harold D. Anderson
*Attorney, Agent, or Firm*—William H. Pittman; James C. Davis, Jr.

[57] ABSTRACT

Odor components are removed from polyphenylene ether resins by extracting the resin with a ketone, preferably acetone. Odor components removed by this method include 7-methyldihydrobenzofuran, dihydrobenzofuran, 2,4,6-trimethylanisole, 2,6-dimethylcyclohexanone, and 2-ethylhex-2-enal, as well as dibutylamines and various unsaturated amines.

12 Claims, No Drawings

METHOD FOR REMOVING ODOR COMPONENTS FROM POLYPHENYLENE ETHER RESINS WITH KETONE

BACKGROUND OF THE INVENTION

This invention relates to a method for removing odor components from a polyphenylene ether resin. More particularly, this invention relates to a method for removing odor components from a polyphenylene ether resin by extracting the resin with a ketone.

Polyphenylene ethers, also known as polyphenylene oxides, are a class of polymers widely used in industry, especially as engineering plastics in applications requiring toughness and heat resistance. In recent years, an increasing interest has developed in using polyphenylene ethers in food packaging applications.

In many of these food packaging applications, it is essential that the polyphenylene ether be free of materials which are volatile, have undesirable odors or would otherwise harm the food. Materials which contribute to the undesirable odor and taste of polyphenylene ether resins include 2,4,6-trimethylanisole, 7-methyldihydrobenzofuran, dihydrobenzofuran, 2,6-dimethylcyclohexanone, and 2-ethylhex-2-enal, all of which are byproducts formed in the synthesis of the substituted phenols from which the polyphenylene ethers are prepared. Of these materials, 2,4,6-trimethylanisole and, to a lesser extent, 7-methyldihydrobenzofuran, appear to be the predominant odor components in polyphenylene ether resins. Other materials contributing to the odor and taste of polyphenylene ether resins include dialkylamines, e.g., di-n-butylamine, and unsaturated amines, which are components of the catalyst used in the preparation of the polyphenylene ethers. The amines are generated when polyphenylene ether is extruded.

Currently, commercial polyphenylene ether is purified by a semicontinuous precipitation from toluene with methanol, removing quinones, other color bodies, catalyst residues and low oligomers from the resin. However, this purification process does not substantially remove the odor components in the polyphenylene ether for two reasons. First, the solvents used to make polyphenylene ether and to precipitate and wash it are recycled which results in a buildup of odor components to a steady state level. Second, methanol, which is used to wash the polyphenylene ether resin, is a relatively poor liquid for removing 2,4,6-trimethylanisole and 7-methyldihydrobenzofuran. As a result, commercial polyphenylene ether may currently be contaminated with these odor components.

Some of these odor components, such as 7-methyldihydrobenzofuran, dihydrobenzofuran, 2,4,6-trimethylanisole, and 2,6-dimethylcyclohexanone, as well as some of the amines, can be removed by vacuum venting, but it has been found that sufficient amounts of these odor components still remain after the vacuum venting process to have a discernible odor.

Thus, a need still exists for a method which substantially removes odor components from polyphenylene ethers.

SUMMARY OF THE INVENTION

The present invention provides a method for removing odor components from polyphenylene ether resins by extracting a polyphenylene ether resin with a ketone in an amount sufficient to substantially remove the odor components from the resin. The invention is based on the discovery that ketones are more effective than methanol in removing certain odor components from polyphenylene ether resins. Ketones have also been found to be superior to vacuum-venting in removing various odor components from polyphenylene ether resins.

Polyphenylene ether resins treated according to the invention do not have a perceptible odor and as a result are suitable for use in food packaging applications.

DETAILED DESCRIPTION OF THE INVENTION

According to the present invention, a polyphenylene ether resin containing odor components is extracted with a ketone, whereby the odor components are transferred from the resin into the ketone, resulting in a polyphenylene ether resin which is substantially free of the odor components.

Suitable polyphenylene ethers and methods for their preparation are known in the art and are disclosed, for example, in U.S. Pat. No. 4,642,358 to Aycock et al, U.S. Pat. No. 4,431,779 to White et al, U.S. Pat. Nos. 3,306,874 and 3,306,875 to Hay and U.S. Pat. Nos. 3,257,357 and 3,257,358 to Stamatoff, all of which are incorporated herein by reference in their entirety.

The polyphenylene ethers suitable for use in the present invention are represented by the formula:

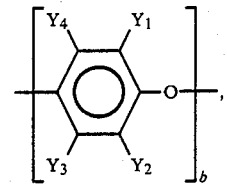

wherein the oxygen ether atom of one structural unit is connected to the benzene nucleus of the next adjoining unit, b is a positive integer and is at least 50, and generally at least 100, and $Y_1$, $Y_2$, $Y_3$ and $Y_4$, which may be the same or different, are monovalent substitutents selected from the group consisting of hydrogen, halogen, hydrocarbon radicals, halohydrocarbon radicals having at least two carbon atoms between the halogen atom and the benzene nucleus, hydrocarboxy radicals and halohydrocarboxy radicals having at least two carbon atoms between the halogen atom and the benzene nucleus. Suitable hydrocarbon radicals include alkyl of one to ten carbon atoms and aryl of six to twenty carbons atoms. Preferred polyphenylene ethers for the purposes of the present invention include those where $Y_1$ and $Y_2$ are selected from alkyl of one to four carbon atoms and phenyl and $Y_3$ and $Y_4$ are hydrogen, Particularly preferred is poly(2,6-dimethyl-1,4-phenylene ether), wherein $Y_1$ and $Y_2$ are methyl. Other preferred polyphenylene ethers include poly(2,6-diphenyl-1,4-phenylene ether), i.e., $Y_1$ and $Y_2$ are phenyl, and poly(2-methyl-6-phenyl-1,4-phenylene ether), i.e., $Y_1$ is methyl and $Y_2$ is phenyl. Other suitable polyphenylene ethers include poly(2-benzyl-6-methyl-1,4-phenylene ether) and poly(2,6-dibenzyl-1,4-phenylene ether).

The polyphenylene ethers may be prepared by any number of catalytic and non-catalytic processes from corresponding phenols or reactive derivatives thereof.

Suitable phenol compounds for the preparation of the polyphenylene ethers may be represented by the general formula:

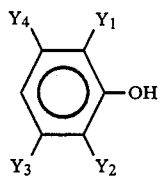

where $Y_1$ through $Y_4$ have the meanings set forth previously.

Examples of suitable phenols include phenol; o-, m- and p-cresols; 2,6-, 2,5-, 2,4-, and 3,5- dimethylphenols; 2-methyl-6-phenyl-phenol; 2,6-diphenylphenol; 2,6-diethylphenol; 2-methyl-6-ethyl-phenol; and 2,3,5-, 2,3,6-, and 2,4,6-trimethylphenol.

One method for preparing the above polyphenylene ethers involves the oxidation of a phenol compound by oxygen or an oxygen-containing gas in the presence of a catalyst for oxidative coupling. There is no particular limitation as to the choice of catalysts and any catalysts for oxidation polymerization can be used, for example, a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a cupric salt, a tertiary amine, and an alkali metal hydroxide such a cupric chloride-pyridine-potassium hydroxide; a catalyst comprising a manganese salt and a primary amine, such a manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

Ketones particularly useful in the practice of this invention are those containing about 3 to about 6 carbon atoms. Acetone is especially preferred because of its availability and its low boiling point, which enables it to be readily purified by distillation for reuse. Although not required by this invention, it is preferred that the ketone be used in its boiling state in the extraction process so as to increase the rate of the extraction, thereby making the process less time-consuming.

The odor components removed from the polyphenylene ether resin in this method include 7-methyldihydrobenzofuran, dihydrobenzofuran, 2,4,6-trimethylanisole, 2,6-dimethylcyclohexanone, and 2-ethylhex-2-enal, which are byproducts of the polymer synthesis, and dibutylamine and unsaturated amines which are generated when polyphenylene ether is extruded.

In this invention, the polyphenylene ether resin is extracted with an amount of ketone sufficient to substantially remove the odor components from the resin. A sufficient amount of ketone is generally that amount sufficient to form a slurry-like mixture of the polyphenylene ether resin and the ketone. Suitable amounts of ketone range from about 2 milliters per gram of polyphenylene ether resin to about 10 milliliters per gram of resin, and preferably about 4 milliliters per gram of resin.

Extraction of the resin with the ketone may be continued for any desired time period; however, if the ketone is used in its non-boiling state, an extraction time of about 0.5 to about 3 hours is generally sufficient, while if boiling ketone is used an extraction time of about 5 to about 60 minutes is sufficient, with about 15 minutes being preferred for economic efficiency.

The resin and the ketone may be brought into contact in any suitable mixing apparatus, for example, a Soxhlet extractor. Suitable extraction techniques include Soxhlet extraction and slurrying. Slurrying is preferred because it involves a shorter extraction time and less capital investment, and is suitable for a continuous process.

Although not necessary if the extraction process is carried out in a Soxhlet extractor, the polyphenylene ether resin should be recovered from the ketone at the completion of the extraction so as to remove any traces of the ketone which may be present in the resin. Recovery of the resin may be accomplished by any method known to those skilled in the art, e.g., filtration or drying. In the preferred method, the mixture of resin and solvent is dried in a vacuum oven at a temperature of about 20° to about 80° C., preferably 60° C., for about 20 to about 24 hours.

The following examples illustrate, without limitation, the principles and practices of the invention.

In the following examples, the amounts of 2,4,6-trimethylanisole and 7-methyldihydrobenzofuran removed were determined quantitatively by an analytical procedure that used naphthalene as an internal standard and used gas chromatography/mass spectroscropy for separation and identification, and the quantities of dihydrobenzofuran, 2,6-dimethylcyclohexanone, and 2-ethylhex-2-enal removed were estimated qualitatively from the gas chromatography/mass spectroscopy tracings for the 2,4,6-trimethylanisole and the 7-methyldihydrobenzofuran.

In determining quantitatively the amount of 2,4,6-trimethylanisole and 7-methyldihydrobenzofuran removed, 1 μl of a standard naphthalene solution, i.e., 45 μg in 1 ml chloroform, was added to a solution of 20 mg poly(2,6-dimethyl-1,4-phenylene ether) in 25 ml chloroform. The chloroform was evaporated in the presence of powdered glass, and the glass and residue were transferred to a small furnace and heated to 250° C. for 10 minutes under a stream of helium. The helium flowed into a liquid nitrogen cooled trap which was then heated to drive the volatiles into a gas chromatography/mass spectrometer. Concentrations of 7-methyldihydrobenzofuran and 2,4,6-trimethylanisole were determined by comparison of ion current intensities of characteristic peaks at m/z 134, 119 or 105 for 7-methyldihydrobenzofuran and at m/z 150 for 2,4,6-trimethylanisole with the naphthalene peak at m/z 128, and application of appropriate response factors.

Mass spectral peaks were used to identify 2,4,6-trimethylanisole and 7-methyldihydrofuran and other volatile components in the gas chromotography/mass spectroscopy analysis described above.

The values for these compounds are shown in Table 1 below.

TABLE 1

| Compound | m/z Values |
| --- | --- |
| 7-methyldihydrobenzofuran | 134 (base peak), 119, 105, 91, 77, 51 (identical to an authentic sample) |
| dihydrobenzofuran | 120 (base peak), 91 |
| 2,4,6-trimethylanisole | 150 (base peak), 135, 119, 107, 91, 79, 65 |
| 2,6-dimethylcyclohexanone | 126, 111, 98; 83, 69 (base peak) 55 |

TABLE 1-continued

| Compound | m/z Values |
| --- | --- |
| 2-ethylhex-2-enal | 126, 111, 97, 55 (base peak), 43 |

EXAMPLES 1-6

Comparison of Acetone and Methanol

In Examples 2-6, two extraction techniques, Soxhlet extraction and slurrying, and two liquids, acetone and methanol, were used to remove odor components from commercial poly(2,6-dimethyl-1,4-phenylene ether) powder. In Example 1, the poly(2,6-dimethyl-1,4-phenylene ether) powder was left untreated. All samples were collected on a filter using additional extraction liquid to transfer the solid polymer and then dried at 60° C. in a vacuum oven at 10 mm for 20 hours.

EXAMPLE 1

A 10 gram sample of poly(2,6-dimethyl-1,4-phenylene ether) powder was left untreated.

EXAMPLE 2

A 10 gram sample of poly(2,6-dimethyl-1,4-phenylene ether) powder was extracted continuously for 20 hours with 40 ml of boiling acetone in a Soxhlet extraction apparatus.

EXAMPLE 3

A 10 gram sample of poly(2,6-dimethyl-1,4-phenylene ether) powder was stirred continuously for 15 minutes with 40 ml of boiling acetone.

EXAMPLE 4

A 10 gram sample of poly(2,6-dimethyl-1,4-phenylene ether) powder was extracted continuously for 20 hours with 40 ml of methanol.

EXAMPLE 5

A 10 gram sample of poly(2,6-dimethyl-1,4-phenylene ether) powder was stirred continuously for 15 minutes with 40 ml of methanol.

EXAMPLE 6

The sample prepared in Example 5 was stirred a second time for 15 minutes with 40 ml of fresh methanol.

The amounts of 7-methyldihydrobenzofuran and 2,4,6-trimethylanisole removed in Examples 1-6 are listed in Table 2 below.

TABLE 2

Amount of 2,4,6-trimethylanisole and 7-methyldihydrobenzofuran (designated herein as 2,4,6-TMA and 7-MBDF, respectively) removed from poly(2,6-dimethyl-1,4-phenylene ether) samples

| Example # | Treatment | Concentration of 2,4,6-TMA (ppm) | Amount of 2,4,6-TMA Removed (%) | Concentration of 7-MBDF (ppm) | Amount of 7-MBDF Removed (%) |
| --- | --- | --- | --- | --- | --- |
| 1 | — | 190 | — | 88 | — |
| 2 | Acetone Extraction | 1.1 | 99.4 | 0.3 | 99.7 |
| 3 | Acetone Slurrying | 1.9 | 99.0 | 0.4 | 99.5 |
| 4 | Methanol Extraction | 19 | 90 | 13 | 85 |
| 5 | Methanol Slurrying | 47 | 75 | 52 | 42 |
| 6 | Methanol Slurrying (Twice) | 25 | 87 | 25 | 72 |

As the data provided in Table 2 indicates, acetone is much more effective than methanol in removing 2,4,6-trimethylanisole and 7-methyldihydrobenzofuran from poly(2,6-dimethyl-1,4-phenylene ether) powder. Extraction with acetone also removed almost all traces of dihydrobenzofuran, 2,6-dimethylcyclohexanone, and 2-ethylhex-2-enal, as well as a variety of other trace components. The resulting poly(2,6-dimethyl-1,4-phenylene ether) did not have a perceptible odor even when the powder was warmed to 60° C. in a closed vial and then examined immediately after opening.

EXAMPLES 7 and 8

Comparison of Acetone Treatment and Vacuum-Venting

EXAMPLE 7

A sample of extruded (vacuum-vented) poly(2,6-dimethyl-1,4-phenylene ether) pellets was slurried with boiling acetone for 15 minutes and then dried.

A sample of extruded (vacuum-vented) poly(2,6-dimethyl-1,4-phenylene ether) pellets was slurried with boiling acetone for 2.5 hours and then dried.

Prior to their treatment with acetone, the vacuum-vented pellets used in Examples 7 and 8 had a characteristic odor at 25° C. and a stronger odor at 60° C. After their treatment with acetone, none of the pellets in either case had an odor, even when warmed to 60° C.

The results of Examples 8 and 9 indicate that treatment with acetone is superior to vacuum-venting in removing odor components from polyphenylene ether, in that sufficient amounts of the odor components still remain after vacuum-venting to have a discernible odor, while sufficient amounts are removed after acetone treatment to result in pellets having no discernible odor.

While the present invention has been described with reference to particular embodiments thereof, it will be understood that numerous modifications may be made by those skilled in the art without actually departing from the spirit and scope of the invention as defined in the appended claims.

What is claimed is:

1. A method for removing odor components from polyphenylene ether resins, comprising extracting a polyphenylene ether resin with a ketone in an amount ranging from about 2 to about 10 millimeters of ketone per gram of polyphenylene ether resin.

2. A method according to claim 1 wherein the ketone has about 3 to about 6 carbon atoms.

3. A method according to claim 2 wherein the ketone is acetone.

4. A method according to claim 1 wherein the polyphenylene ether is poly (2,6-dimethyl-1,4-phenylene ether).

5. A method according to claim 1 wherein the odor components are 7-methyldihydrobenzofuran, dihydrobenzofuran, 2,4,6-trimethylanisole, 2,6-dimethylcyclohexane and 2-ethylhex-2-enal.

6. A method according to claim 1 wherein the odor components are dibutylamine and unsaturated amines.

7. A method according to claim 1 wherein the ketone is used in the amount of about 4 millimeters per gram of polyphenylene ether resin.

8. A method according to claim 1 wherein the polyphenylene ether resin is extracted with the ketone for about 0.5 to about 3 hours.

9. A method according to claim I wherein the ketone is in its boiling state during the extraction process.

10. A method according to claim 9 wherein the polyphenylene ether resin is extracted with the boiling ketone for about 5 to about 60 minutes.

11. A method according to claim 10 wherein the polyphenylene ether resin is extracted with the boiling ketone for about 15 minutes.

12. A method according to claim 1 further comprising recovering the polyphenylene ether resin from the ketone at the completion of the extraction.

* * * * *